July 5, 1949.  W. A. CHANCELLOR  2,475,075
LUBRICATOR FOR AIR COMPRESSORS AND THE LIKE
Filed May 22, 1946  2 Sheets-Sheet 1

Inventor
William A. Chancellor,
By Clarence A. O'Brien
and Harvey B. Jacobson
Attorneys

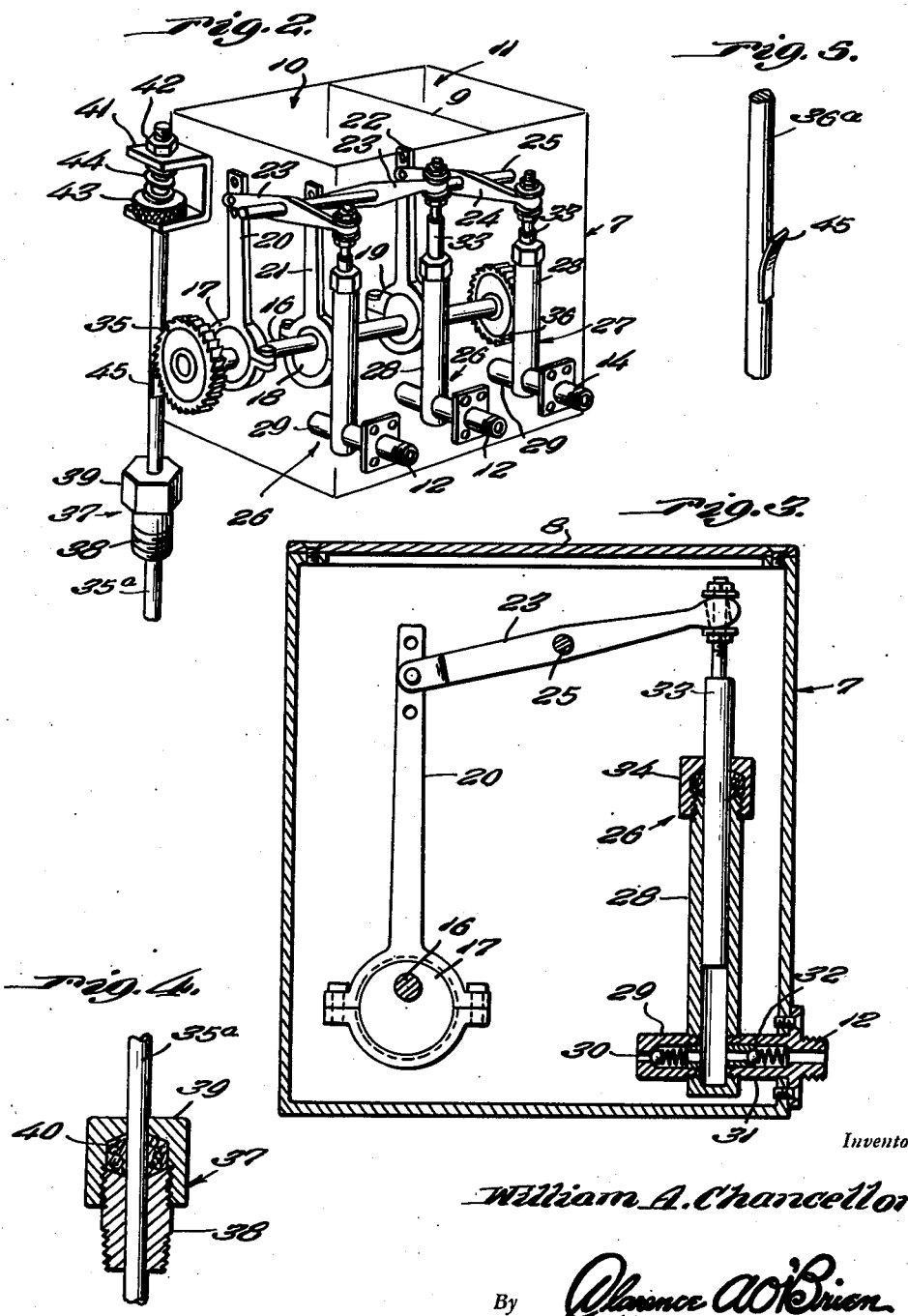

Patented July 5, 1949

2,475,075

UNITED STATES PATENT OFFICE 2,475,075

LUBRICATOR FOR AIR COMPRESSORS AND THE LIKE

William A. Chancellor, Lizella, Ga., assignor of one-half to O. J. Jenkins, Macon, Ga.

Application May 22, 1946, Serial No. 671,608

11 Claims. (Cl. 184—27)

The present invention relates to an improved lubricator which is expressly, but not necessarily, adapted to supply lubricating oils to predetermined portions of an air compressor, there being two oil pipes to deliver oil to the air end of the compressor and a third pipe to deliver oil to the steam end of the same compressor.

In carrying out the principles of the invention I provide a simple and expedient oil containing tank having individual oil compartments and a plurality of pressure pumps arranged to coact with separated chambers or compartments in said tanks.

More specifically, novelty is predicated upon a tank divided by a partition into separated compartments, said compartments each containing different grades of lubricating oils considered as necessary and proper for delivery to the respective air and steam ends of the compressor, the aforementioned pump being properly positioned for coaction with the selected compartments.

An outstanding and perhaps the most important object of the invention is to provide a multiple pump equipped lubricator of the aforementioned type wherein a crankshaft is employed to operate the pumps, said crankshaft having intermittently operable pawl and ratchet devices coacting with the opposite outer ends of said crankshaft.

Additional novelty is predicated upon the adoption and use of perpendicular reciprocatory rods coacting with the tank and compressor, respectively, said rods serving to carry and actuate the pawls and the lower ends of said rods extending into piston chambers in the air end of the compressor, this in a manner to permit the pistons to intermittently and alternatively engage said lower ends for purposes of transmitting motion to the rods and motion to the pawl and ratchet devices on said crankshaft.

Other objects, features and advantages of the invention will become more readily apparent from the following description and the accompanying illustrative drawings.

In the drawings, wherein like numerals are employed to designate like parts throughout the views:

Figure 2 is a perspective view of the crankshaft and pumping assembly and other parts showing, in diagrammatic or phantom form the partitioned tank for the lubricating oils.

Figure 3 is a section through the tank showing one of the pump units in section and elevation and also showing the crankshaft and operating means connected therewith.

Figure 4 is a detailed sectional and elevational view of one of the fittings adopted for purposes of operatively connecting the reciprocatory rod with the head of the compressor.

Figure 5 is a fragmentary perspective view of the rod and a pawl carried thereby.

Figure 1:
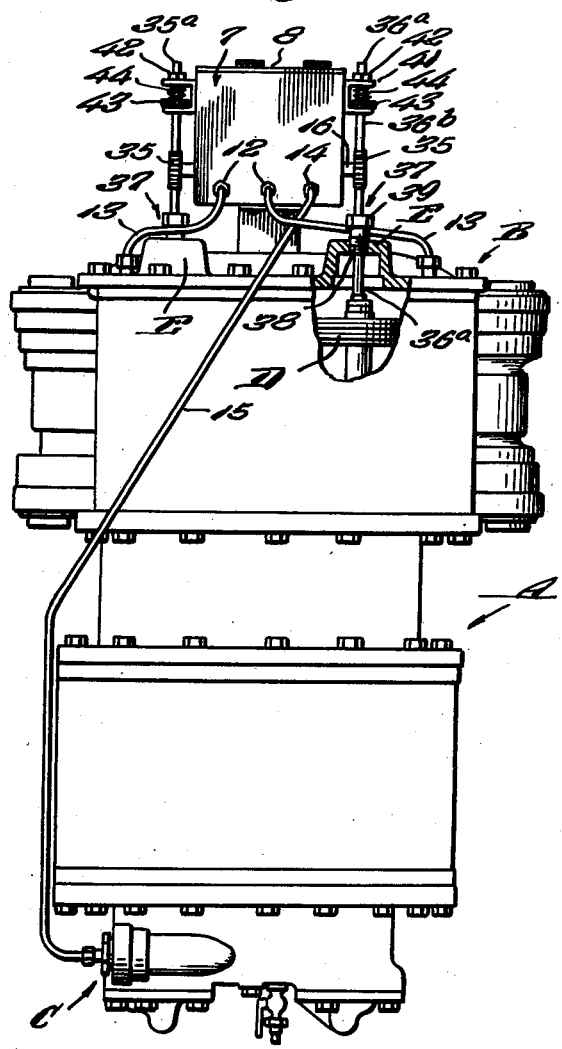
Figure 1 is an elevational view, partly in section, showing what may be designated as a conventional compressor and further showing the special lubricator mounted atop said compressor with the delivery lines connected with the air and steam ends of the compressor.

Reference is first had to Figure 1 wherein the compressor is denoted by the reference character A. The aforementioned air end is denoted at B and the steam end at C. In the air end I have broken away part of the casing to show an existing or stock piston D. The mound-like bosses are denoted by the reference character E are stock or existing parts and have screw-threaded holes normally closed by plugs (not shown).

Reference being had now to Figures 2 and 3, it will be seen that the aforementioned oil or lubricant containing tank is denoted by the numeral 7 and this is of rectangular form and it is provided on its otherwise open top with a cover plate 8. As shown in the phantom representation in Figure 2, the tank is divided by a partition 9 into separate compartments or chambers 10 and 11, these to contain different grades of lubricating oil, one grade for the air end B, and another grade or weight for the steam end C. The outlets for the chamber 10 is denoted by the numerals 12 and these serve to accommodate pipes 13 which lead to and are connected with the air end B of the compressor A. The remaining outlet 14, which registers with the chamber 11 serves to accommodate a longer pipe 15 which leads to and is properly connected with the steam end C of the compressor.

I next call attention to a crankshaft 16 which is mounted in the lower portion of the tank and rotatable in appropriate bearings (not shown). The crankshaft is provided with cranks or eccentrics 17, 18 and 19 to operate the respective pitman rods 20, 21 and 22, respectively. The upper ends of the pitmans are adjustably and operatively connected with rockers 23 and 24, these being mounted for operation on an appropriately supported shaft 25. The two rockers 23 serve to operate the pumps 26 in the compartment 10 while the remaining rocker 24 serves to operate the final pump 27 in the compartment 11. All of the pumps are of the same construction and the description of one will suffice for all, for which reason attention is directed to Figure 3. Here, the pump comprises a cylinder 28 having an intake fitting 29 at the lower end with a properly arranged and constructed ball check valve 30 therein. The opposite fitting, which is the discharge side 31, is provided with a properly arranged spring-pressed ball check valve 32. This fitting lines up with the outlet nipples 12 or 14, as the case may be. The piston rod is denoted at 33 and is operable through a suitably packed head 34 on the upper end of the cylinder. Incidentally, I am not especially concerned with the crankshaft, pitmans and rocker assembly. Nor do I stress the particular construction of the pumps. I am concerned with the provision of suitable pumps in the chambers 10 and 11 and operating means for the pumps whereby to obtain the desired intermittent pumping results.

I provide duplicate compressor actuated operating devices for the crankshaft 16. Although the devices are at opposite ends of the tank and operate alternatively and, therefore, intermittently in order to obtain desired continuous pumping results, each device is the same in construction. It is believed, therefore, that the description of one will suffice for both. However, it is desirable, perhaps to differentiate the ratchet wheel 35 at the left-hand end from the complemental ratchet wheel 36 at the right-hand end. Also, the left-hand rod is indicated at 35a and the remaining rod at 36a.

Each rod is mounted in a packing gland 37 which includes a threaded bushing 38 with the lower end screw-threaded to tap into a screw-threaded opening in the coacting mound or boss E. The bushing is provided with a cap 39 and this contains the desired wad of packing 40 and completes the gland contruction. Thus, I provide a gland or fitting which is such as to function on the stock boss E. The lower end of the rod projects into the piston chamber where it comes into contact with the piston head, thus utilizing the stroke of the piston to impart a corresponding stroke to the rod. The upper end of the rod is slidable in a U-bracket 41 mounted on the tank, said upper end being threaded and being provided with an assembling and retaining nut 42. An adjustable thrust collar 43 is carried by the rod and located between the arms of the brackets and acts on a cushioning spring 44 provided at this point. The spring pawl 45 is mounted on the rod for coaction with the teeth of the ratchet wheel. It follows that the ratchet devices at opposite ends of the crankshaft are operated by the reciprocatory rods 35a and 36a, the latter deriving motion from the reciprocating pistons in the compressor. It follows, therefore, that we utilize the stock parts of the compressor to operate the lubricator and utilize the oil from the lubricator through proper lines, to feed the lubricating oils through pipes 13 and 15 to the ends B and C of the compressor.

While the invention speaks of lubricator for compressors it is obvious that a lubricator of this construction can be utilized in other types of machinery.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. A lubricator of the class described, comprising a tank having a partition dividing same into separate compartments, said compartments being adapted to contain different weights of lubricating oils, pumps mounted in said compartments, and operating means for the pumps, said operating means comprising a crankshaft, pitmans connected with the crankshaft, and rockers connected to said pitmans and pumps.

2. In a lubricator construction of the class described, a lubricant container, a pump in said container, a shaft mounted for rotation in said container, said shaft being provided with an eccentric, a pitman connected with the eccentric, a rocker affording an operating connection between the pitman and pump, and a ratchet wheel on said shaft.

3. In a lubricator construction of the class described, a lubricant container, a pump in said container, a shaft mounted for rotation in said container, said shaft being provided with an eccentric, a pitman connected with the eccentric, a rocker affording an operating connection between the pitman and pump, a ratchet wheel on said shaft, a rod mounted for reciprocation on said tank, said rod being provided with a pawl and said pawl being engageable with said ratchet wheel.

4. In a structure of the class described, a pump-equipped tank, a shaft mounted for rotation in said tank and having operating connection with the pump, and ratchets on said shaft at opposite ends, and alternately operable reciprocatory operating devices for said ratchets.

5. In a structure of the class described, a pump-equipped tank, a shaft mounted for rotation in said tank and having operating connection with the pump, and ratchets on said shaft at opposite ends, and alternately operable reciprocatory operating devices for the ratchets, each device comprising a rod, a fitting for mounting the rod on said tank, said rod being slidable in said fitting.

6. In a structure of the class described, a pump-equipped tank, a shaft mounted for rotation in said tank and having operating connection with the pump, ratchets on said shaft at opposite ends, and alternately operable reciprocatory operating devices for the ratchets, each device comprising a rod, a fitting for mounting the rod on said tank, said rod being slidable in said fitting, and a bushing-equipped gland for mounting the rod on an existing boss on a compressor, the bushing being screw-threaded to tap into a screw-threaded hole in said boss.

7. In a structure of the class described, a pump-equipped tank, a shaft mounted for rotation in said tank and having operating connection with the pump, ratchets on said shaft at opposite ends, alternately operable reciprocatory operating devices for the ratchets, each device comprising a rod, a fitting for mounting the rod on said tank, said rod being slidable in said fitting, a bushing-equipped gland for mounting the rod on an existing boss on a compressor, the bushing being screw-threaded to tap into a screw-threaded hole in said boss, and a spring pawl mounted on the intermediate portion of the rod for coaction with the adjacent ratchet.

8. In a structure of the class described, an oil containing tank, a shaft mounted for rotation in said tank, a pump in the tank, an operating connection between the shaft and pump, a ratchet wheel on the shaft, a U-bracket on said tank, a reciprocatory motion transmitting rod adjustably cushioned and mounted in said U-bracket, and a spring pawl on said rod engageable with the teeth of the ratchet wheel.

9. In a structure of the class described, an oil containing tank, a shaft mounted for rotation in said tank, a pump in the tank, an operating connection between the shaft and pump, a ratchet wheel on the shaft, a U-bracket on said tank, a reciprocatory motion transmitting rod adjustably cushioned mounted in said U-bracket, and a spring pawl on said rod engageable with the teeth of the ratchet wheel, and a packing gland including a cap and a bushing, said rod being slidable through the cap and bushing and said bushing being provided with screw-threads of a predetermined size and type to tap into an existing screw-threaded hole in a stock part of a known type of compressor.

10. A lubricator of the class described comprising a tank having a partition dividing same into separate compartments, said compartments being adapted to contain lubricating oils of different weights, a pump mounted in each compartment and adapted to pump oil therefrom to be delivered to a predetermined point, a shaft mounted for rotation in said tank and operating in said compartments, operating connections between the respective pumps and said shaft, a ratchet wheel exteriorly located on the tank and connected with said shaft, a rod mounted exteriorly on the tank for reciprocation, said rod being provided with a pawl and said pawl being engageable with said ratchet wheel, a second ratchet wheel, the latter being exteriorly mounted on an opposite end of the tank and serving to operate an adjacent end of said shaft, a second and independent rod mounted for reciprocation on the last named end of the tank, said last named rod being provided with a pawl and said pawl being engageable with the second named ratchet wheel.

11. The structure specified in claim 10, together with separate bushings having glands, said bushings being adapted to be mounted on existing bosses on a conventional type compressor, and said rods being mounted for reciprocation in said bushings.

WILLIAM A. CHANCELLOR.

REFERENCES CITED

The following references are of record in the file of this patent:

UNITED STATES PATENTS

| Number | Name | Date |
|---|---|---|
| 1,048,916 | Thomas | Dec. 31, 1912 |
| 1,397,548 | Ripley | Nov. 22, 1921 |

FOREIGN PATENTS

| Number | Country | Date |
|---|---|---|
| 25,259 | Norway | Nov. 23, 1914 |
| 173,361 | Great Britain | Jan. 5, 1922 |